United States Patent [19]

Ishizaka et al.

[11] Patent Number: 4,538,890
[45] Date of Patent: Sep. 3, 1985

[54] CAMERA PROVIDED WITH A MECHANISM FOR DETECTING THE FILM SPEED OF A FILM

[75] Inventors: Sunao Ishizaka; Osamu Maida, both of Tokyo, Japan

[73] Assignee: Nippon Kogaku K.K., Tokyo, Japan

[21] Appl. No.: 608,802

[22] Filed: May 10, 1984

[30] Foreign Application Priority Data

May 16, 1983 [JP] Japan .................................. 58-85458

[51] Int. Cl.³ .......................... G03B 7/24; G03B 1/60; G03B 17/36
[52] U.S. Cl. .................................. 354/21; 354/173.1; 354/217
[58] Field of Search ...................... 354/21, 217, 289.1, 354/289.12, 173.1

[56] References Cited

U.S. PATENT DOCUMENTS 4,200,371 4/1980 Suzuki et al. ...................... 354/21
4,440,481 4/1984 Hoda et al. .................. 354/289.12

Primary Examiner—William B. Perkey
Attorney, Agent, or Firm—Fitzpatrick, Cella, Harper & Scinto

[57] ABSTRACT

A camera into which a magazine containing a film therein and provided with means indicative of information concerning the film speed of the film can be loaded includes a device for detecting the film speed of the film on the basis of the information when the magazine is loaded into the camera and producing a first film speed signal indicative of the detected film speed, a device for manually setting the film speed of the film and producing a second film speed signal indicative of the set film speed of the film, a device for detecting the difference between the film speeds of the film indicated by the first and second film speed signals and producing a warning signal, a device for drawing out the film from the loaded magazine, and a device for hindering the production of the warning signal in response to the draw-out of a predetermined amount of film from the magazine.

11 Claims, 2 Drawing Figures

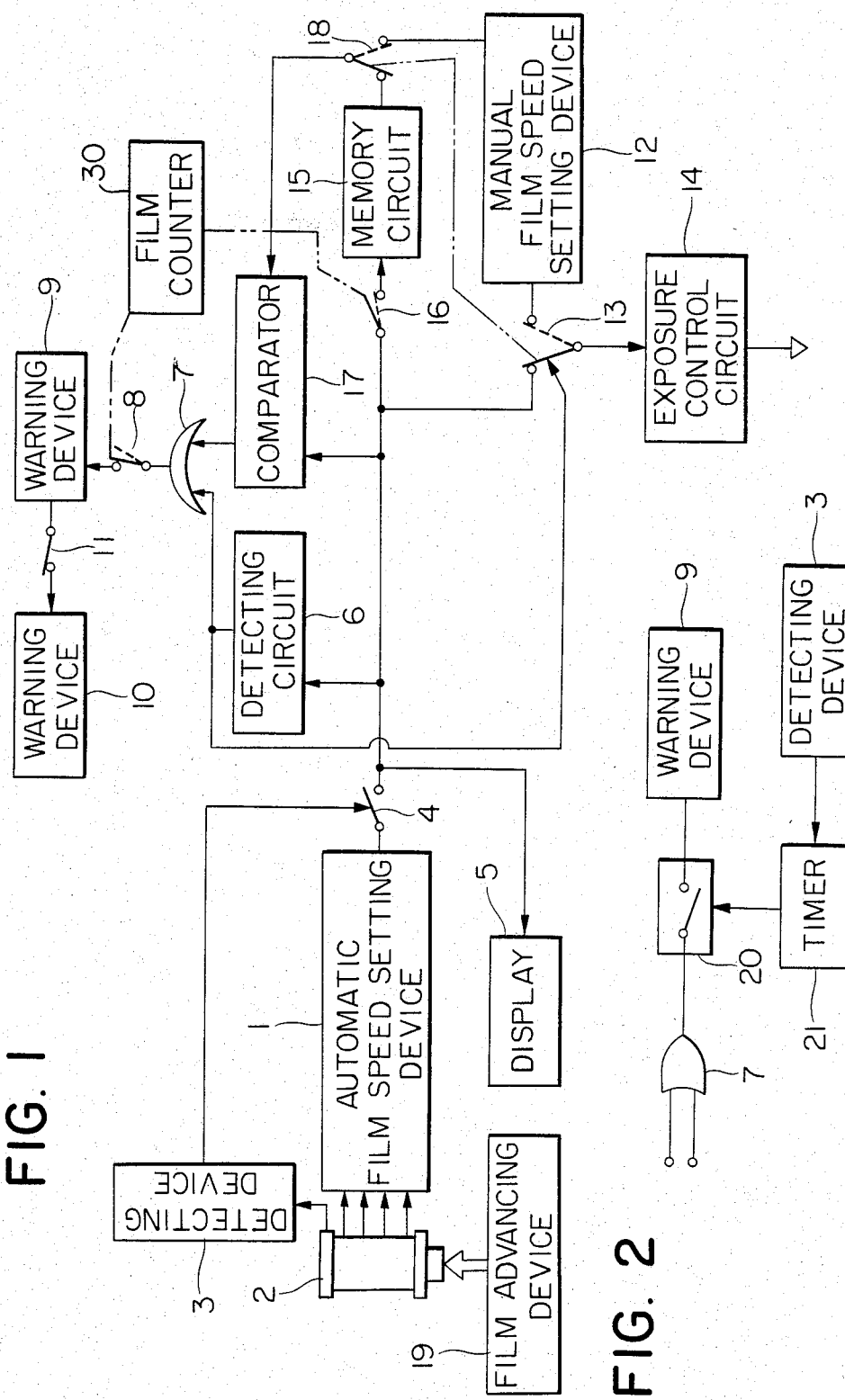

4,538,890

CAMERA PROVIDED WITH A MECHANISM FOR DETECTING THE FILM SPEED OF A FILM

BACKGROUND OF THE INVENTION

1. Field of the Invention

This invention relates to a camera provided with an automatic film speed setting mechanism for detecting the film speed information provided on a magazine and automatically setting the film speed and a manual film speed setting mechanism for manually setting the film speed of the film.

2. Description of the Prior Art

There is an idea that the film speed information of 35 mm film or the like for a camera is provided on the magazine of the film or on the film itself in advance and the camera detects the film speed of the film by loading the magazine into the camera and an exposure mechanism is automatically controlled on the basis of the detected film speed. As a camera based on such idea, there can be supposed a camera having a mechanism for automatically setting the film speed of the film and a mechanism for manually setting the film speed of the film.

In a camera of this type, when the film speed information put out from the automatic film speed setting mechanism and the film speed information put out from the manual film speed setting mechanism represent different values, a mechanism for warning about that fact by light or sound becomes necessary. As this warning mechanism, there is conceived, for example, a construction which continues the warning until the two types of information are made coincident with each other by manual setting. However, in a case where the user uses the camera with the two types of information made different from each other on purpose, for example, in a case where exposure control is effected with the value manually set by the manual film speed setting mechanism for the purpose of exposure correction, the warning may continue long and rather become an offence to the eye or the ear. Further, consumption of the power source may also be accelerated.

SUMMARY OF THE INVENTION

It is an object of the present invention to provide a camera in which consumption of the power source is reduced as much as possible without the warning continuing long and becoming offensive to the eye or the ear even when the camera is used with the information from the manual film speed information setting mechanism and the information from the automatic film speed information setting mechanism being different from each other.

To achieve such object, the present invention is characterized by the provision of automatic film speed setting means for detecting film speed information provided on a film and automatically setting the film speed, manual film speed setting means for manually setting the film speed, comparison means for comparing the film speed information from the automatic film speed setting means and the film speed information from the manual film speed setting means and putting out an incoincidence signal when the two types of information represent different film speeds, warning means for receiving the incoincidence signal and giving a warning in the form of light or sound, and stop means for counting the number of photographed frames of the film and stopping the warning by the warning means at the latest when the film is wound up to a photographing position.

The invention will become more fully apparent from the following detailed description thereof taken in conjunction with the accompanying drawings.

BRIEF DESCRIPTION OF THE DRAWINGS

FIG. 1 is a block diagram showing an embodiment of the present invention.

FIG. 2 is a block diagram showing another embodiment of the present invention.

DESCRIPTION OF THE PREFERRED EMBODIMENT

Referring to FIG. 1 which is a block diagram showing an embodiment of the present invention, an automatic film speed setting device 1 detects film speed information recorded on the surface of a film container 2 loaded into a camera and puts out it as an automatic film speed information signal. A detecting device 3 for detecting the presence of a film detects the film when loaded into the camera and closes a switch 4. Thus, the automatic film speed information signal becomes capable of being transmitted to other portions of the camera. A display device 5 receives this automatic film speed information signal and displays the detected film speed of the film. A detecting circuit 6 for detecting the presence of the film speed information receives the automatic film speed information signal and detects whether the film speed information is recorded on the surface of the film container 2, and when such information is not recorded on said surface, it puts out a NO signal indicative of that fact. This NO signal is supplied to a warning device 9 using a display in the finder and a warning device 10 using a sound through an OR circuit 7 and a switch 8. The warning device 9 effects a warning in the finder by LED or the like in response to the NO signal, and the warning device 10 makes a warning sound in response to the NO signal. The warning sound can be extinguished at any time by manually opening a switch 11.

It is the usual practice that the portion of the film to which light may leak when the film is loaded into the camera for photography is not used for photography but is taken up. There are also cameras having a mechanism whereby photography is effected after all of a film is drawn out of a magazine in advance and then the photographed portions of the film are successively received into the magazine. That is, there are the above-described two methods of taking up the film from the magazine, and these are generically named the initial feeding.

The switch 8 is a switch operatively associated with a film counter 30 for counting the number of frames of the film to stop said warning, and is closed to continue said warning only during the initial feeding of the film before which the film has been wound up to the photographing position by a film advancing device 19, and is opened to stop said warning when the initial feeding is completed. The film advancing device 19 includes a motor for electrically winding up the film.

A manual film speed setting device 12 puts out a manually set film speed as a manual film speed information signal. A switch 13, when connected to a terminal on the automatic setting side as indicated by the solid line, supplies the automatic film speed information signal from the automatic film speed setting device 1 to an exposure control device 14, and when connected to a terminal on the manual setting side as indicated by the broken line, supplies the manual film speed information signal from the manual film speed setting device 12 to the exposure control device 14. The switch 13 is manually changeable over and, when the NO signal is put out, it is automatically changed over to the terminal on the manual setting side.

According to the present invention, when use is made of a film on the container of which there is recorded no film speed information, a warning for urging the manual setting of the film speed is given by the warning devices 9 and 10, and the exposure control device 14 is automatically connected to the manual film speed setting device 12 and therefore, failure in photographing can be obviated.

A memory circuit 15, which comprises a RAM or the like, receives the automatic film speed information signal from the automatic film speed setting device 1 and stores it. The storage timing is controlled by a switch 16 operatively associated with the film counter 30. The switch 16 is open only during the initial feeding before which the film has been wound up, and is closed to supply the automatic film speed information signal from the automatic film speed setting device 1 to the memory circuit 15 when the initial feeding is completed. Along therewith, the stored content of the memory circuit 15 is renewed from the film speed information of the film loaded during the previous photography to the film speed information of the film newly loaded each time the initial feeding is completed.

A comparator 17 compares the film speed information signal from the memory circuit 15 with the automatic film speed information signal from the automatic film speed setting device 1 when a switch 18 is connected to a terminal on the automatic setting side as indicated by the solid line, and when the two signals are incoincident with each other, it puts out an incoincidence signal indicative of that fact. That is, it is because the film speed of the film previously loaded and the film speed of the film presently loaded differ from each other that the comparator 17 produces the incoincidence signal when the switch 18 is connected to the terminal on the automatic setting side. When the switch 18 is connected to a terminal on the manual setting side as indicated by the broken line, the comparator 17 compares the manual film speed information signal from the manual film speed setting device 12 with the automatic film speed information signal from the automatic film speed setting device 1 and, when the two signals are incoincident with each other, it puts out an incoincidence signal indicative of that fact. The switch 18 operates just in the same manner as the switch 13 in response to the switch 13.

The incoincidence signal, like the previously mentioned NO signal, is supplied to the warning devices 9 and 10 through the OR circuit 7. It is also possible that the warning device 9 is responsive to the incoincidence signal to give a warning in the finder in a manner different from that in the case of the NO signal and the warning device 10 is responsive to the incoincidence signal to make a warning sound in a manner different from that in the case of the NO signal. For example, if design is made such that the incoincidence signal is distinguished from the NO signal by directly inputting the incoincidence signal not only to the OR circuit 7 but also to the warning devices 9 and 10, then the aforementioned manners of the warning devices 9 and 10 will also be possible.

This warning also is effected only during the initial feeding in which the film is wound up to the photographing position, as in the case of the previously mentioned NO signal.

FIG. 2 shows another embodiment of the present invention. In this embodiment, the detecting device 3, the OR circuit 7 and the warning device 9 are similar to those of FIG. 1. This embodiment differs from the embodiment of FIG. 1 in that a switch 20 is provided instead of the switch 8 and a timer 21 is added. The other blocks are similar to those of FIG. 1 and therefore are not shown.

The timer 21 produces a high level signal for a predetermined period in response to the detecting device 3 detecting the presence of a film. The switch 20 conducts for a period during which the output of the timer 21 is at high level, and directs the output of the OR circuit 7 to the warning device.

This embodiment corresponds to a camera having a mechanism whereby during the initial feeding, all of the film is once drawn out of the magazine and thereafter the portions of the film exposed by photography are successively received into the magazine. That is, considerable much time is required to draw out all of the film from the magazine and therefore, the warning is stopped by the timer 21 and the switch 20 before the draw-out of the film from the magazine is terminated. Accordingly, the period during which the output of the timer 21 is at high level is set to a value shorter than the period required until the film is completely drawn out of the magazine.

We claim:

1. A camera into which a magazine containing a film therein and provided with means indicative of information concerning the film speed of the film can be loaded, said camera including:
    (a) means for detecting the film speed of said film on the basis of said information when said magazine is loaded into said camera and producing a first film speed signal indicative of said detected film speed;
    (b) means for manually setting the film speed of said film and producing a second film speed signal indicative of said set film speed of said film;
    (c) means for detecting the difference between the film speeds of said film indicated by said first and second film speed signals and producing a warning signal in response to the presence of said difference between the film speeds of said film indicated by said first and second film speed signals;
    (d) warning means operable in response to said warning signal;
    (e) means for drawing out the film from said loaded magazine; and
    (f) means for hindering operation of said warning means in response to the draw-out of a predetermined amount of film from said magazine regardless of the production of said warning signal.

2. A camera according to claim 1, further including:
    means for selecting one of said first and second film speed signals;
    means for controlling the exposure of said film on the basis of said selected signal;
    means for detecting that said magazine is not provided with means indicative of information concerning said film speed and producing a detection signal; and means for controlling said selecting means so as to select said second film speed signal in response to said detection signal.

3. A camera into which a magazine containing a film therein and provided with means indicative of information concerning the film speed of the film can be loaded, said camera including:
(a) means for detecting the film speed of said film on the basis of said information when said magazine is loaded into said camera and producing a first film speed signal indicative of said detected film speed;
(b) memory means for storing said first film speed signal before said magazine is removed from said camera and producing said stored first film speed signal as a second film speed signal; and
(c) means for comparing said first and second film speed signals.

4. A camera according to claim 3, further including means for preventing said first film speed signal from being stored in said memory means in response to the loading of said magazine into said camera.

5. A camera according to claim 4, further including:
means for drawing out the film from said loaded magazine; and
means for causing said memory means to store said first film speed signal in response to the drawout of a predetermined amount of film from said magazine.

6. A camera according to claim 3, wherein said comparison means produces a warning signal when there is a difference between the film speeds indicated by said first and second film speed signals.

7. A camera according to claim 6, further including:
means for manually setting the film speed of said film and producing a third film speed signal indicative of said set film speed of said film,
means for supplying said third film speed signal instead of said second film speed signal to said comparison means,
means for drawing out the film from said loaded magazine, and
means for hindering the production of said warning signal in response to the draw-out of a predetermined amount of film from said magazine,
said comparison means producing said warning signal when there is a difference between the film speeds indicated by said first and third film speed signals.

8. A camera according to claim 7, further including:
means for selecting one of said first and third film speed signals;
means for controlling the exposure of said film on the basis of said selected signal;
means for detecting that said magazine is not provided with means indicative of information concerning said film speed and producing a detection signal; and
means for controlling said selecting means to select said third film speed signal in response to said detection signal.

9. A camera according to claim 6, further including:
means for manually setting the film speed of said film and producing a third film speed signal indicative of said set film speed of said film;
means for supplying said third film speed signal instead of said second film speed signal to said comparison means; and
means for hindering the production of said warning signal after a predetermined time has elapsed after the production of said warning signal;
said comparison means producing said warning signal when there is a difference between the film speeds indicated by said first and third film speed signals.

10. A camera according to claim 9, further including:
means for selecting one of said first and third film speed signals;
means for controlling the exposure of said film on the basis of said selected signal;
means for detecting that said magazine is not provided with means indicative of information concerning said film speed and producing a detection signal; and
means for controlling said selecting means so as to select said third film speed signal in response to said detection signal.

11. A camera into which a magazine containing film therein and provided with means indicative of information concerning the film speed of the film can be loaded, said camera including:
(a) means for detecting the film speed of said film on the basis of said information when said magazine is loaded into said camera and producing a first film speed signal indicative of said detected film speed;
(b) means for manually setting the film speed of said film and producing a second film speed signal indicative of said set film speed of said film;
(c) means for detecting the difference between the film speeds of said film indicated by said first and second film speeds signals and producing a warning signal in response to the presence of said difference between the film speeds of said film indicated by said first and second film speed signals;
(d) warning means operable in response to said warning signal;
(e) means for electrically driven means for drawing out the film from said loaded magazine; and
(f) means for hindering said warning means from warning in response to the draw-out of a predetermined amount of film from said magazine regardless of the production of said warning signal.

* * * * *

UNITED STATES PATENT AND TRADEMARK OFFICE
CERTIFICATE OF CORRECTION

PATENT NO. : 4,538,890
DATED : September 3, 1985
INVENTOR(S) : SUNAO ISHIZAKA, ET AL.

It is certified that error appears in the above-identified patent and that said Letters Patent is hereby corrected as shown below:

Column 4, line 25, delete "much".

Signed and Sealed this

Twelfth Day of November 1985

[SEAL]

Attest:

Attesting Officer

DONALD J. QUIGG

Commissioner of Patents and Trademarks